(12) United States Patent
Megason et al.

(10) Patent No.: US 9,874,702 B2
(45) Date of Patent: Jan. 23, 2018

(54) OPTICAL CONNECTOR ASSEMBLY APPARATUS

(71) Applicant: HEWLETT PACKARD ENTERPRISE DEVELOPMENT LP, Houston, TX (US)

(72) Inventors: George D. Megason, Spring, TX (US); Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/324,167

(22) PCT Filed: Oct. 29, 2014

(86) PCT No.: PCT/US2014/062783
§ 371 (c)(1),
(2) Date: Jan. 5, 2017

(87) PCT Pub. No.: WO2016/068892
PCT Pub. Date: May 6, 2016

(65) Prior Publication Data
US 2017/0199336 A1   Jul. 13, 2017

(51) Int. Cl.
*G02B 6/38* (2006.01)

(52) U.S. Cl.
CPC ......... *G02B 6/3825* (2013.01); *G02B 6/3849* (2013.01); *G02B 6/3874* (2013.01); *G02B 6/3893* (2013.01); *G02B 6/3897* (2013.01)

(58) Field of Classification Search
CPC .. G02B 6/3825; G02B 6/3849; G02B 6/3874; G02B 6/3893; G02B 6/3897
See application file for complete search history.

(56) References Cited

U.S. PATENT DOCUMENTS

| 4,258,977 A | * | 3/1981 | Lukas | G02B 6/3801 264/1.1 |
| 4,279,469 A | * | 7/1981 | Forman | G02B 6/3825 385/54 |

(Continued)

FOREIGN PATENT DOCUMENTS

| JP | 09211264 A | * | 8/1997 | ........... G02B 6/3813 |
| JP | 10148730 A | * | 6/1998 | |

(Continued)

OTHER PUBLICATIONS

International Search Report and Written Opinion; PCT/US2014/062783; dated Jul. 28, 2015; 9 pages.

*Primary Examiner* — Peter Radkowski
(74) *Attorney, Agent, or Firm* — Brooks, Cameron & Huebsch, PLLC

(57) ABSTRACT

Example implementations relate to an optical connector assembly apparatus. For example, an optical connector assembly apparatus can include a lead-in nose disposed at a proximal end of the apparatus for insertion into a sleeve housing, where the sleeve housing has a shutter flap to cover an opening in the sleeve. Also, the optical connector assembly apparatus can include a plurality of beams transverse to the lead-in nose to provide a force to hold the shutter flap in an open position, and a tab disposed at a distal end of the apparatus to receive an end cap of an optical blind-mate connector adapter.

15 Claims, 7 Drawing Sheets

(56) References Cited

U.S. PATENT DOCUMENTS

| | | | | |
|---|---|---|---|---|
| 4,361,380 A * | 11/1982 | Marazzi | G02B 6/3833 | 285/13 |
| 4,444,461 A * | 4/1984 | Wey | G02B 6/3825 | 385/139 |
| 4,664,462 A * | 5/1987 | Owens | H01R 13/516 | 439/378 |
| 4,690,494 A * | 9/1987 | Hirose | G02B 6/3807 | 385/60 |
| 5,363,460 A * | 11/1994 | Marazzi | G02B 6/3825 | 385/55 |
| 5,506,922 A * | 4/1996 | Grois | G02B 6/3825 | 385/75 |
| 5,542,015 A * | 7/1996 | Hultermans | G02B 6/3893 | 385/139 |
| 5,810,614 A * | 9/1998 | Ruch | H01R 13/629 | 439/247 |
| 5,825,955 A * | 10/1998 | Ernst | G02B 6/3825 | 385/38 |
| 5,887,098 A * | 3/1999 | Ernst | G02B 6/3825 | 385/55 |
| 5,909,526 A * | 6/1999 | Roth | G02B 6/3825 | 385/56 |
| 5,915,058 A * | 6/1999 | Clairardin | G02B 6/3825 | 385/55 |
| 6,062,893 A * | 5/2000 | Miskin | H01R 13/65802 | 439/374 |
| 6,076,975 A * | 6/2000 | Roth | G02B 6/3825 | 385/60 |
| 6,079,881 A * | 6/2000 | Roth | G02B 6/3825 | 385/139 |
| 6,081,647 A * | 6/2000 | Roth | G02B 6/3825 | 385/139 |
| 6,095,862 A * | 8/2000 | Doye | H01R 13/65802 | 439/138 |
| 6,108,482 A * | 8/2000 | Roth | G02B 6/3825 | 385/139 |
| 6,154,597 A * | 11/2000 | Roth | G02B 6/3825 | 385/139 |
| 6,186,670 B1 * | 2/2001 | Austin | G02B 6/3825 | 385/55 |
| 6,206,730 B1 * | 3/2001 | Avery | H01R 23/6873 | 439/607.18 |
| 6,209,162 B1 * | 4/2001 | Clairadin | B08B 1/00 | 15/210.1 |
| 6,209,163 B1 * | 4/2001 | Clairadin | B08B 1/00 | 15/210.1 |
| 6,240,229 B1 * | 5/2001 | Roth | G02B 6/3825 | 385/53 |
| 6,276,963 B1 * | 8/2001 | Avery | H01R 13/65802 | 439/541.5 |
| 6,287,146 B1 * | 9/2001 | Avery | H01R 12/7029 | 439/607.4 |
| 6,315,590 B1 * | 11/2001 | Grois | G02B 6/3893 | 439/248 |
| 6,331,079 B1 * | 12/2001 | Grois | G02B 6/3821 | 385/53 |
| 6,361,218 B1 * | 3/2002 | Matasek | G02B 6/3821 | 385/53 |
| 6,371,657 B1 * | 4/2002 | Chen | G02B 6/3825 | 385/139 |
| 6,398,422 B1 * | 6/2002 | Szilagyi | G02B 6/3849 | 385/76 |
| 6,406,192 B1 * | 6/2002 | Chen | H01R 13/6315 | 385/56 |
| 6,422,759 B1 * | 7/2002 | Kevern | G02B 6/3825 | 385/58 |
| 6,425,694 B1 * | 7/2002 | Szilagyi | G02B 6/3849 | 385/139 |
| 6,471,412 B1 * | 10/2002 | Belenkiy | G02B 6/3825 | 385/137 |
| 6,508,593 B1 * | 1/2003 | Farnsworth | G02B 6/3825 | 385/134 |
| 6,554,482 B1 * | 4/2003 | Matasek | G02B 6/3825 | 385/136 |
| 6,685,362 B2 * | 2/2004 | Burkholder | G02B 6/3825 | 385/78 |
| 6,702,477 B1 * | 3/2004 | Ngo | G02B 6/3825 | 385/55 |
| 6,712,523 B2 * | 3/2004 | Zimmel | G02B 6/266 | 385/55 |
| 6,715,928 B1 * | 4/2004 | Matasek | G02B 6/4277 | 385/56 |
| 6,755,574 B2 * | 6/2004 | Fujiwara | G02B 6/3897 | 385/53 |
| 6,764,222 B1 * | 7/2004 | Szilagyi | G02B 6/3849 | 385/55 |
| 6,793,399 B1 * | 9/2004 | Nguyen | G01M 11/088 | 356/241.1 |
| 6,824,311 B2 * | 11/2004 | Chen | G02B 6/3821 | 385/78 |
| 6,827,608 B2 * | 12/2004 | Hall | H01R 13/6315 | 439/578 |
| 6,986,607 B2 * | 1/2006 | Roth | G02B 6/3849 | 385/55 |
| 7,029,322 B2 * | 4/2006 | Ernst | G02B 6/4277 | 385/56 |
| 7,261,471 B2 * | 8/2007 | Tsuchida | G02B 6/3825 | 385/55 |
| 7,340,146 B2 * | 3/2008 | Lampert | G02B 6/3849 | 385/134 |
| 7,422,376 B2 * | 9/2008 | Chen | G02B 6/3821 | 385/78 |
| 7,676,133 B2 * | 3/2010 | Lampert | G02B 6/3849 | 220/254.1 |
| 8,083,547 B2 * | 12/2011 | Roth | G02B 6/3817 | 439/607.1 |
| 8,517,613 B2 * | 8/2013 | Kevern | G02B 6/3825 | 385/56 |
| 8,690,593 B2 * | 4/2014 | Anderson | G02B 6/3825 | 439/326 |
| 9,261,654 B2 * | 2/2016 | Murphy | G02B 6/3825 | |
| 9,632,255 B2 * | 4/2017 | Anderson | G02B 6/3825 | |
| 2003/0147597 A1 * | 8/2003 | Duran | G02B 6/3825 | 385/76 |
| 2003/0148645 A1 * | 8/2003 | Hashimoto | H01R 13/4532 | 439/137 |
| 2003/0210870 A1 * | 11/2003 | Graves | H04Q 11/0005 | 385/71 |
| 2004/0038586 A1 * | 2/2004 | Hall | H01R 13/6315 | 439/578 |
| 2004/0179787 A1 * | 9/2004 | Glazowski | G02B 6/3849 | 385/76 |
| 2004/0223701 A1 * | 11/2004 | Tanaka | G02B 6/3825 | 385/55 |
| 2005/0058402 A1 * | 3/2005 | Ernst | G02B 6/4277 | 385/56 |
| 2005/0152536 A1 * | 7/2005 | Caveney | H01R 13/4536 | 379/438 |
| 2006/0153503 A1 * | 7/2006 | Suzuki | G02B 6/3807 | 385/53 |
| 2008/0056647 A1 * | 3/2008 | Margolin | G02B 6/4201 | 385/89 |
| 2008/0260332 A1 * | 10/2008 | Murano | G02B 6/3831 | 385/56 |
| 2009/0028507 A1 * | 1/2009 | Jones | G02B 6/3825 | 385/56 |
| 2011/0085774 A1 * | 4/2011 | Murphy | G02B 6/3825 | 385/134 |
| 2011/0158586 A1 * | 6/2011 | Katagiyama | G02B 6/3825 | 385/55 |
| 2011/0262077 A1 * | 10/2011 | Anderson | G02B 6/3825 | 385/78 |
| 2014/0286610 A1 * | 9/2014 | Anderson | G02B 6/3825 | 385/76 |

(56) References Cited

U.S. PATENT DOCUMENTS

2015/0378109 A1* 12/2015 Samal .................. G02B 6/3809
 385/58
2016/0116682 A1* 4/2016 Murphy ............... G02B 6/3825
 385/56

FOREIGN PATENT DOCUMENTS

| JP | 11248979 A | * | 9/1999 | ........... G02B 6/3825 |
| JP | 11258458 A | * | 9/1999 | ........... G02B 6/3825 |
| JP | 11337768 A | * | 12/1999 | ........... G02B 6/3825 |
| JP | 2002350675 A | * | 12/2002 | |
| JP | 2005258193 A | * | 9/2005 | |
| JP | 2006113152 | | 4/2006 | |
| WO | WO-20130126068 | | 8/2013 | |

* cited by examiner

OPTICAL CONNECTOR ASSEMBLY APPARATUS

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector.

DETAILED DESCRIPTION

Optical transmission systems may be employed to interconnect network elements. Optical modules include optical fibers, which may be connected end-to-end to transfer light or optical power there between. The fibers may be terminated in connector assemblies and may be mated by an adapter. Some such optical connection systems may include blind-mate connections. As used herein, a blind-mate connection refers to a connection in which optical modules are mated without necessarily having any visual and/or tactile indications that the optical modules are properly aligned. Precision alignment (in the range of 1 um to 50 um, for example) between the optical modules can be achieved through the use of blind-mating alignment structures, so that human vision in not involved for aligning the optical modules to make the connection.

Optical modules are sometimes enclosed in an electronic module enclosure along with other components. Blade server enclosures, for example, may include a plurality of bays that house individual blade servers, optical modules, and power supply modules, among other components.

In some electronic module enclosure arrangements, an optical module may be coupled to another optical module via an optical blind-mate connector adapter. However, coupling one optical module to another may require additional space within the electronic module enclosure in order for users to connect modules by hand. Additionally, coupling optical modules by hand can require additional assembly time in order to correctly connect the optical modules. Furthermore, optical modules may not be coupled correctly the first time, which may require removal of the modules. Removal of optical modules after coupling can result in damaged modules since the modules may be designed to be low cost, and may be designed for one-time and semi-permanent installation.

In contrast, an optical connector assembly apparatus according to the present disclosure can reduce assembly time, prevent injuries to assemblers, reduce the chances of damage to mid-planes, and prevent damage to surrounding structures within the electronic module enclosure. Furthermore, an optical connector assembly apparatus according to the present disclosure can allow for rapid installation of optical modules in optical blind-mate connector adapter assemblies, as compared to installation without the optical connector assembly apparatus. Also, an optical connector assembly apparatus according to the present disclosure can enable an assembler to verify that shutter flaps on optical blind-mate connector adapter assemblies are installed properly, thereby improving the quality and efficiency of the optical module installation.

Figure 1:
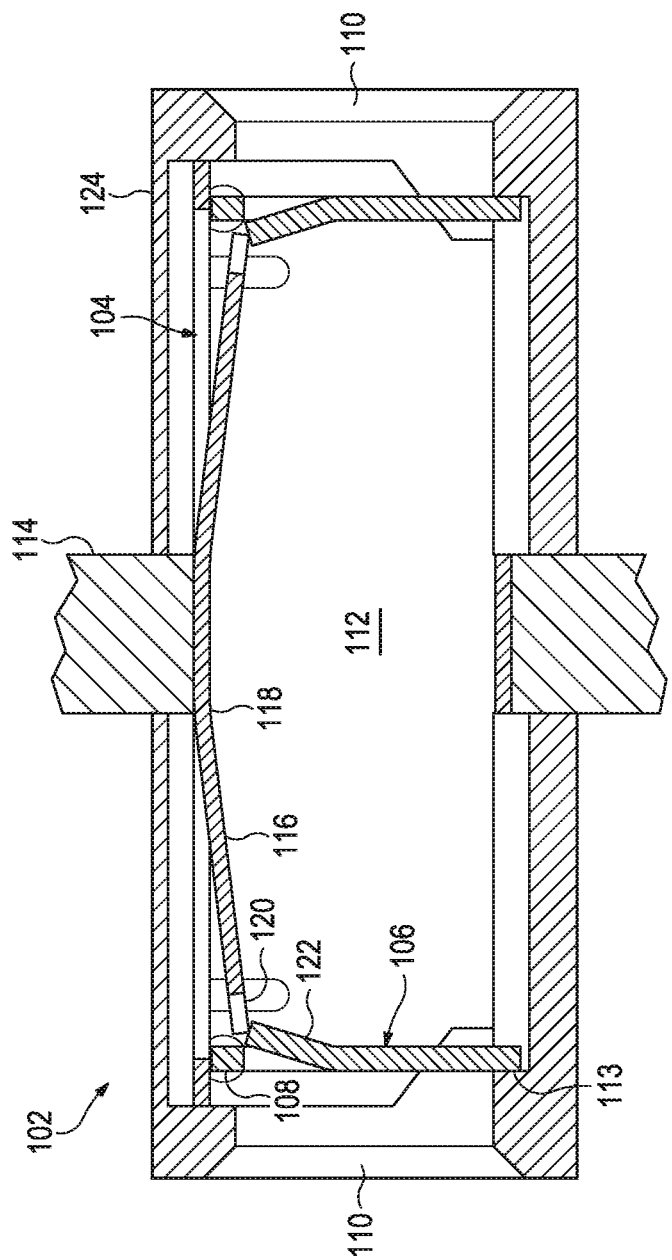
FIG. 1 illustrates a cross-section side view of an example optical blind-mate connector adapter according to the present disclosure.

FIG. 1 illustrates a cross-section side view of an example optical blind-mate connector adapter 102 according to the present disclosure. As illustrated in FIG. 1, the optical blind-mate connector adapter 102 may include a sleeve 104 having a shutter flap 106 mounted on a pivot 108 at an opening 110 of the sleeve 104. The shutter flap 106 may be pivotable about the pivot 108 to move between a closed position and an open position extending toward an interior 112 of the sleeve 104. In some examples, the sleeve 104 can include a pair of shutters 106 disposed at distal ends of the sleeve 104. As such, the shutters 106 can be individually moveable between a closed position and an open position to enable blind-mating of optical modules from both sides and within the optical blind-mate connector adapter 102.

The sleeve 104 can comprise any suitable material, though in some examples the sleeve 104 may comprise metal. In some examples, the sleeve 104 can include shaped features to facilitate aligning an optical blind-mate connector within the sleeve 104.

The optical blind-mate connector adapter 102 can include a cantilever spring 116 to urge the shutter flap 106 to the closed position, as illustrated in FIG. 1. The cantilever spring 116 can include an anchor end 118 anchored to a wall of the sleeve 104 and a free end 120 angled away from the wall of the sleeve 104 and extending toward the opening 110. The shutter flap 106 can include a tab 122 facing the interior 112 of the sleeve 104. The free end 120 of the cantilever spring 116 can engage the tab 122 to urge the shutter flap 106 toward the closed position.

In some examples, the optical blind-mate connector adapter 102 can be mounted onto a stationary plane, such as, for example, a mid-plane 114 of a blade server enclosure, shown in partial view in FIG. 1. One example material of a mid-plane may be a circuit board. Other example materials of a mid-plane may be metal, plastic or other conductive or non-conductive materials. The mid-plane may allow optical modules to couple through the optical blind-mate connector adapter 102. The integrated shutter flaps 106 may provide for restriction of air-flow, dust, and/or light (e.g., from a fiber optic cable) through the optical blind-mate connector adapter 102. The sleeve 104 may be disposed, at least in part, in a sleeve housing 124. In some examples, the sleeve 104 can be integrally-formed to the sleeve housing 124. As discussed further herein, an optical connector assembly apparatus can be inserted into the opening 110, and can provide a force to hold the shutter flaps 106 in an open position during assembly of the optical blind-mate connector adapter 102 in a mid-plane 114.

Figure 2:
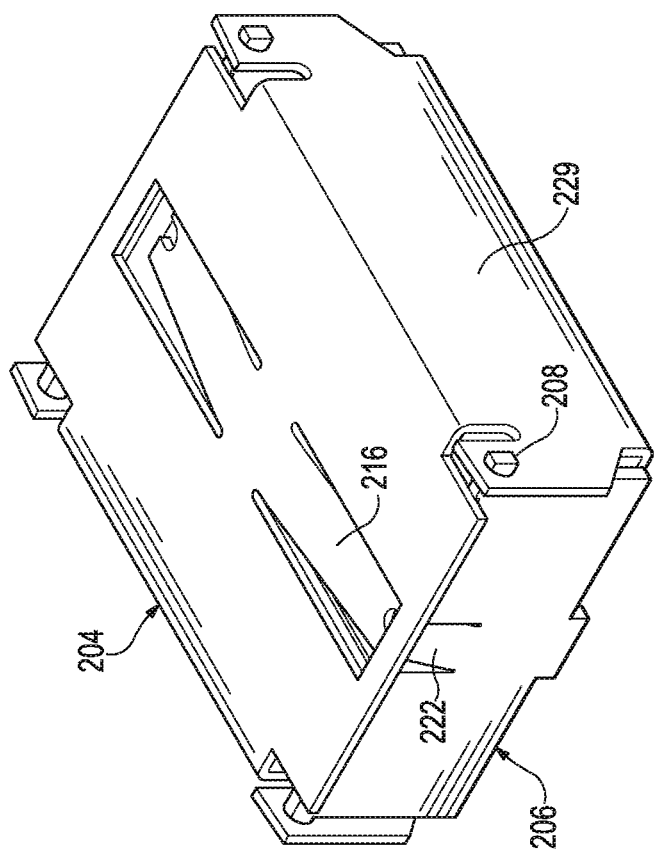
FIG. 2 illustrates a perspective view of an example sleeve for an optical blind-mate connector adapter according to the present disclosure.

FIG. 2 illustrates a perspective view of an example sleeve 204 for an optical blind-mate connector adapter according to the present disclosure. As illustrated in FIG. 2, the sleeve 204 can have cantilever springs 216 on a top surface of the sleeve 204 that can engage the tab 222. In some examples, the sleeve 204 can include indents on each side surface, as further illustrated in FIG. 5. For instance, the side surface 229 can include an indent and/or recessed area (not shown) that can provide an added force to the sleeve 204 in the mid-plane 114. The references to "top" and "side" are applicable when the sleeve 204 is oriented as shown in FIG. 2.

Figure 5:
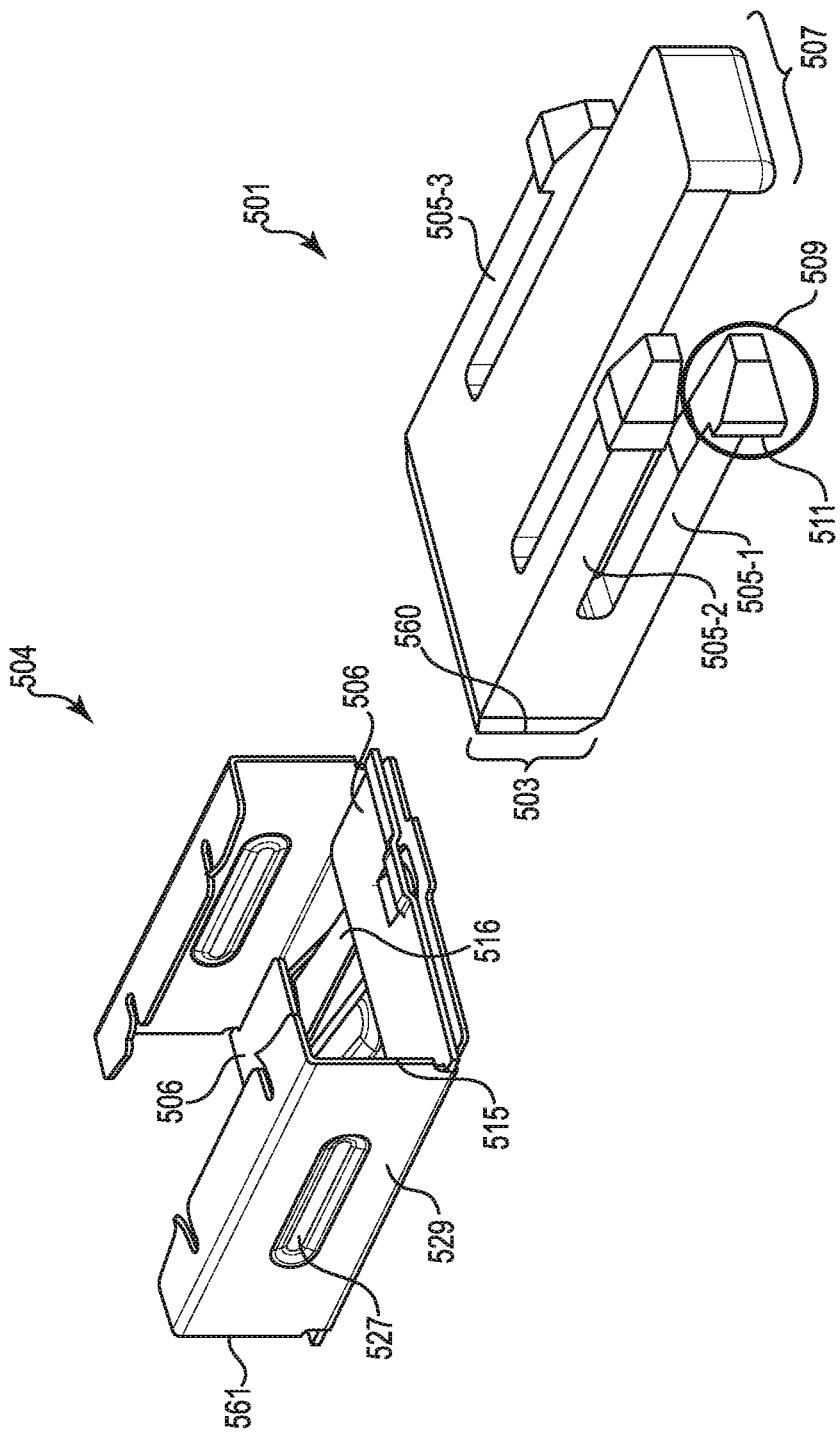
FIG. 5 illustrates an optical connector assembly apparatus according to the present disclosure.

As discussed in relation to FIG. 5, an optical connector assembly apparatus can be configured to conform to the structural components of the optical blind-mate connector adapter 202. For example, the optical connector assembly apparatus can be configured for insertion into the opening in the sleeve 204, and can be configured to provide a force to hold the shutter flaps 206 in an open position. By configuring the optical connector assembly apparatus to conform to the structural components of the optical blind-mate connector adapter 202, the optical connector assembly apparatus can assist with the installation of the optical blind-mate connector adapter 202 in the mid-plane (e.g., the mid-plane 114 illustrated in FIG. 1).

Figure 3:
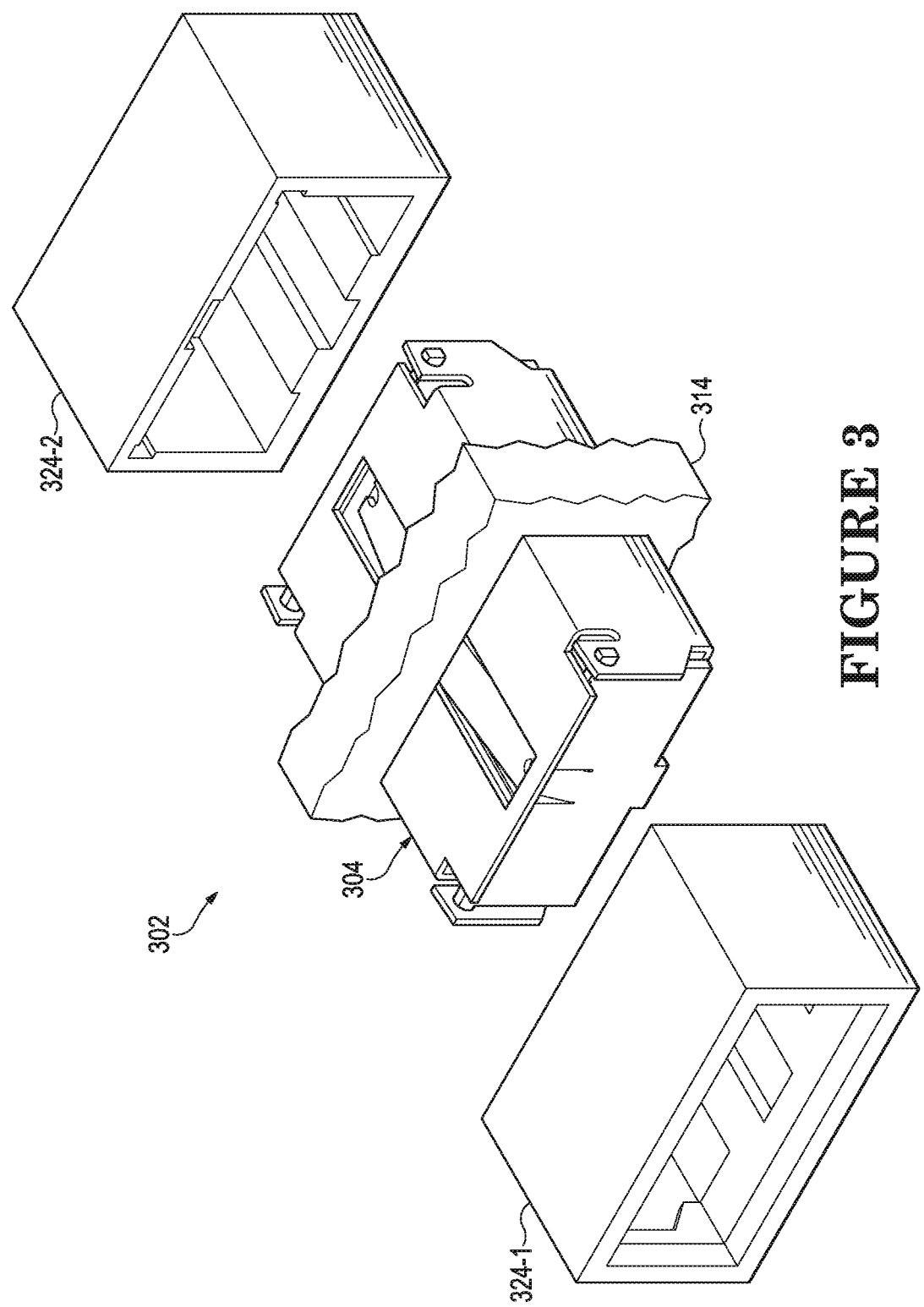
FIG. 3 illustrates an exploded view of an example optical blind-mate connector adapter according to the present disclosure.

FIG. 3 illustrates an exploded view of an example optical blind-mate connector adapter 302 according to the present disclosure. As illustrated in FIG. 3, an optical blind-mate connector adapter 302 can include a sleeve 304 within a sleeve housing comprising a first sleeve housing end 324-1 at a first side of the mid-plane 314 and a second sleeve housing end 324-2 at a second side of the mid plane 314. In some examples, separate sleeve housing ends 324-1 and 324-2 can allow a hole in the mid-plane 314 to be smaller than would otherwise be the case for implementations including a unitary sleeve housing. For example, the hole in the mid-plane 314 can have a dimension of about 18 mm×10 mm.

As illustrated in FIG. 3, sleeve housing ends 324-1 and 324-2 can be disposed at opposite sides of mid-plane 314. In some examples, the mid-plane can be a circuit board, such as an electrical mid-plane circuit board. However, examples are not so limited, and the mid-plane 314 can include other stationary plane types, such as metal and/or plastic. Also, the sleeve housing ends 324-1 and 324-2 can be end caps of the optical blind-mate connector adapter 302. For instance, the sleeve housing ends 324-1 and 324-2 can be configured to securely fit over the respective ends of the sleeve 304. Similarly, the sleeve housing ends 324-1 and 324-2 can be configured to securely fit over the respective ends of the sleeve 304 when an optical connector assembly apparatus is inserted into the sleeve 304.

Figure 4:
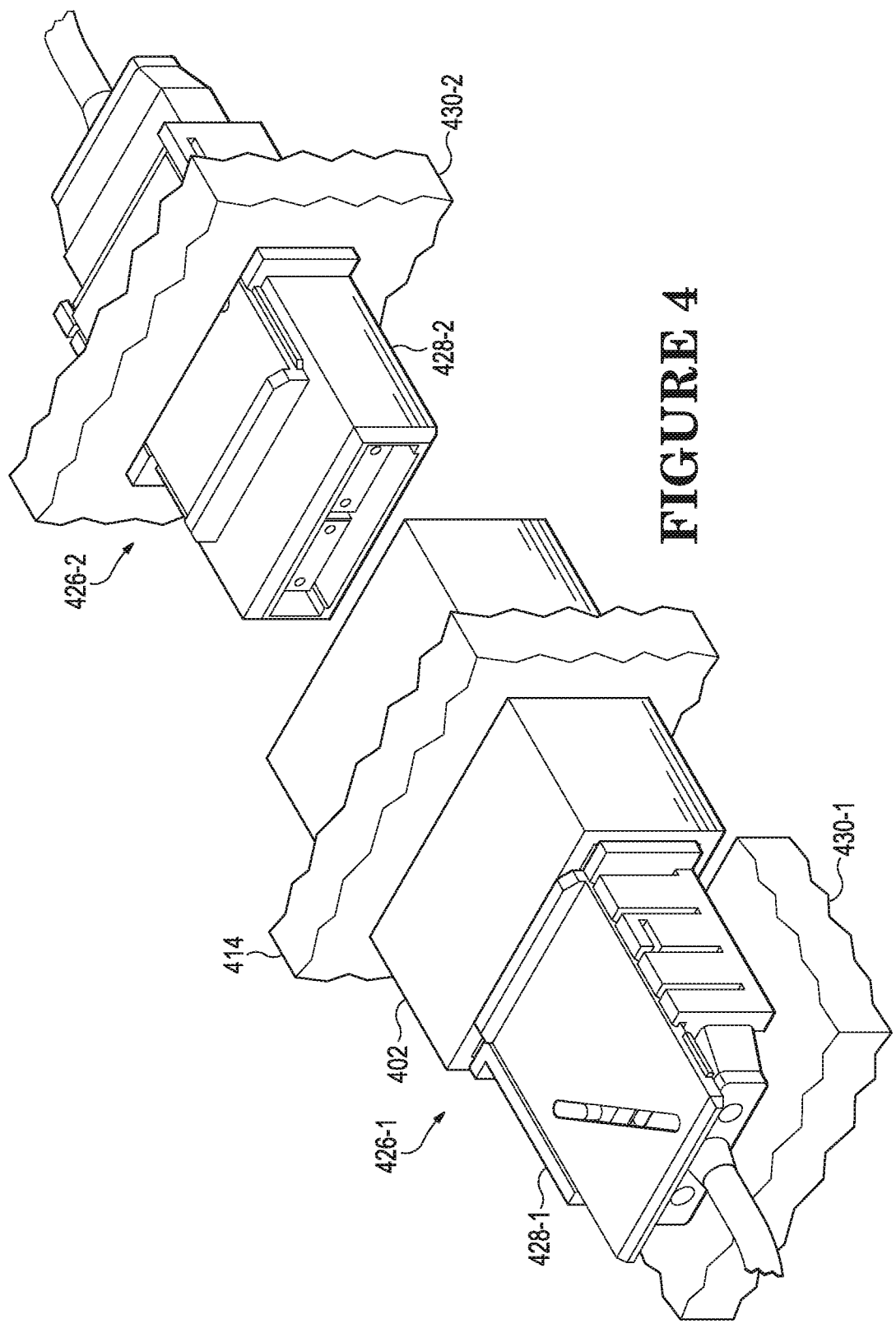
FIG. 4 illustrates an example system including a first optical module which may be connected to a second optical module via an optical blind-mate connector adapter according to the present disclosure.

FIG. 4 illustrates an example system including a first optical module 426-1, which may be connected to a second optical module 426-2 via an optical blind-mate connector adapter 402 according to the present disclosure. An optical connector 428-1 of the first optical module 426-1 may be blind-mated to one side of the optical blind-mate connector adapter 402, and an optical connector 428-2 of the second optical module 426-2 may be blind-mated to the other side of the optical blind-mate connector adapter 402. The optical blind-mate connector adapter 402 may be mounted onto a stationary plane or mid-plane circuit board 414, and the connectors 428-1, 428-2 may each be mounted onto respective circuit board 430-1 or module bulkhead mounting panel 430-2 to form the optical modules 426-1, 426-2, respectively. In some examples, one or both of the optical modules 426-1, 426-2 can comprise a system module, and in some examples, the system module can include high-power active components. In some examples, one of the optical modules 426-1, 426-2 may comprise a connectivity module with a few or no active components. In some examples, the planes of the circuit board 430-1 and mounting panel 430-2 of the optical modules 426-1, 426-2 may be oriented orthogonally to each other, as illustrated, or may be parallel to each other. In various examples, the planes of the circuit board 430-1 or mounting panel 430-2 of the optical modules 426-1, 426-2 may be oriented orthogonally or parallel to the mid-plane circuit board 414.

As discussed in relation to FIG. 1, FIG. 3, and FIG. 4, an optical blind-mate connector adapter can be installed in the mid-plane 414. Using the optical connector assembly apparatus can reduce the time to connect the optical blind-mate connector adapter in the mid-plane 414, can prevent injuries to assemblers, and can reduce the risk of damage to surrounding structures when multiple optical module and optical blind-mate connector adapter assemblies are constructed in the mid-plane 414.

FIG. 5 illustrates an optical connector assembly apparatus 501 according to the present disclosure. As discussed in relation to FIGS. 1, 2, 3, and 4, the optical connector assembly apparatus 501 can be inserted into the sleeve 504 of an optical blind-mate connector adapter and can assist with installation of the optical blind-mate connector adapter assembly apparatus 501 in the mid-plane (e.g., mid-plane 414 illustrated in FIG. 4). While FIG. 5 illustrates the optical connector assembly apparatus 501 as a rectangular or box-like structure, examples are not so limited. The optical connector assembly apparatus 501 can be in other shapes, but configured for insertion into, and removal from, the sleeve 504.

To facilitate insertion of the optical connector assembly apparatus 501 into the sleeve 504, the optical connector assembly apparatus 501 can have a lead-in nose 503 disposed at a proximal end of the optical connector assembly apparatus 501. As used herein, a lead-in nose refers to a beveled, angled, rounded, ramped, or otherwise tapered end of the optical connector assembly apparatus 501 that allows for insertion of the optical connector assembly apparatus 501 into the sleeve 504 without compromising the integrity of the structural components of the optical connector assembly apparatus 501. Prior to insertion of the optical connector assembly apparatus 501 into the sleeve 504, the shutter flaps 506 are placed in the open position (as illustrated in FIG. 5), pressing down on the cantilever springs 516.

As illustrated in FIG. 5, the optical connector assembly apparatus 501 can have a plurality of beams 505-1, 505-2, 505-3 (herein referred to as the plurality of beams 505). While FIG. 5 illustrates three (3) visible beams, a fourth beam is included in the optical connector assembly apparatus 501 illustrated, although it is obstructed by the tab 507 in the perspective view. Furthermore, while four (4) beams are contemplated in the optical connector assembly apparatus 501 illustrated in FIG. 5, examples are not so limited, and the optical connector assembly apparatus 501 can include more or fewer beams than four.

The plurality of beams 505 can be transverse or orthogonal to the lead-in nose 503. As discussed further in relation to FIG. 6, the plurality of beams 505 can be configured to provide a force to hold the shutter flaps 506 in an open position. For instance, as illustrated in FIG. 5, shutter flaps 506 are illustrated as being in an open position. The open position refers to the shutter flaps 506 being oriented parallel to the base of the sleeve 504 in the orientation shown in FIG. 5. Upon insertion of the optical connector assembly apparatus 501 into the sleeve 504, the plurality of beams can provide spring force to hold the optical connector assembly apparatus 501 in the sleeve 504, but also to hold the shutter flaps 506 in the open position.

Each of the plurality of beams 505 can have structural components which assist in the installation of optical modules in the optical blind-mate connector adapter. Each of the plurality of beams 505 can have an angled tip 509 distal to the lead-in nose 503, which can receive an end cap of the optical blind-mate connector adapter. For instance, referring to FIG. 3, end cap 324-1 can be inserted over the optical connector assembly apparatus 501 while the optical connector assembly apparatus is inserted into the sleeve 504. To facilitate inserting the end cap 324-1 over the optical connector assembly apparatus 501, each of the plurality of beams 505 can have an angled, beveled, rounded, or otherwise tapered tip 509 that is configured to receive the end cap 324-1. Furthermore, each of the tips 509 can have a plane 511 parallel to the plane 560 of the lead-in nose 503, the plane 511 to apply a stopping force against the sleeve 504. As used herein, the plane 560 of the lead-in nose 503 refers to the flat plane of the lead-in nose 503 illustrated in FIG. 5, rather than the sloped edges of the lead-in nose 503. Upon insertion of the optical connector assembly apparatus 501 into the sleeve 504, the plane 511 of the tip 509 can rest against a side edge 515 of the sleeve 504, thereby holing the optical connector assembly apparatus 501 in the sleeve 504. As described further in relation to FIG. 6, each of the tips 509 can also be configured to receive a mid-plane, such as a mid-plane circuit board.

Also, as illustrated in FIG. 5, the plurality of beams 505 can be configured to receive an indent 527 on a side surface 529 of the sleeve 504. In other words, the optical connector assembly apparatus 501 can have an opening between beam 505-1 and beam 505-2, which can receive the indent 527 when the optical connector assembly apparatus 501 is inserted into the sleeve 504.

As illustrated in FIG. 5, the optical connector assembly apparatus 501 can have a tab 507 disposed at a distal end of the optical connector assembly apparatus 501. The tab 507 can be configured to receive an end cap of the optical blind-mate connector adapter, such as end cap 324-1 illustrated in FIG. 3. That is, the tab 507 can be smaller than the hole in the end cap such that the end cap can be disposed over the optical connector assembly apparatus 501. Furthermore, the tab 507 can be smaller than the hole in a mid-plane, such that the mid-plane can also be disposed over the optical connector assembly apparatus 501. As illustrated in FIG. 5, the optical connector assembly apparatus 501 can be configured such that the tab 507 extends away from the sleeve 504 when the optical connector assembly apparatus 501 is inserted into the sleeve 504. In some examples, the tab 507 can extend outward past the side edge 515 of the sleeve 504, as well as the tips 509. By extending outward past other structural components of the optical connector assembly apparatus 501, an installer can grasp the tab 507 with fingers and/or another tool for inserting the optical connector assembly apparatus 501 into the sleeve 504 as well as removing of the optical connector assembly apparatus 501 from the sleeve 504. As illustrated in FIG. 5, the tab 507 can include a lip or ridge that further allows an installer to grasp the optical connector assembly apparatus 501. In some examples, the tab 507 can have a ribbed surface (not shown in FIG. 5) that can make gripping the tab 507 easier for installers.

While FIG. 5 illustrates the optical connector assembly apparatus 501 as having a plurality of beams 505 and a tab 507 that are solid structures, examples are not so limited. To reduce the amount of material used in constructing the optical connector assembly apparatus 501, the beams 505 and/or the tab 507 can have a hollow core. For example, the sides of each of the plurality of beams 505 can have openings that allow air to pass through the optical connector assembly apparatus 501 and reduce the amount of material used. In another example, each of the sides of the tab 507 can have openings that allow air to pass through the optical connector assembly apparatus 501. Additionally and/or alternatively, the side surfaces of each of the plurality of beams 505 and/or the tab 507 can be solid surfaces, but the inside of the optical connector assembly apparatus 501 can be hollow and/or filled with air. The optical connector assembly apparatus 501 may be constructed using plastic, or other materials.

Figure 6:
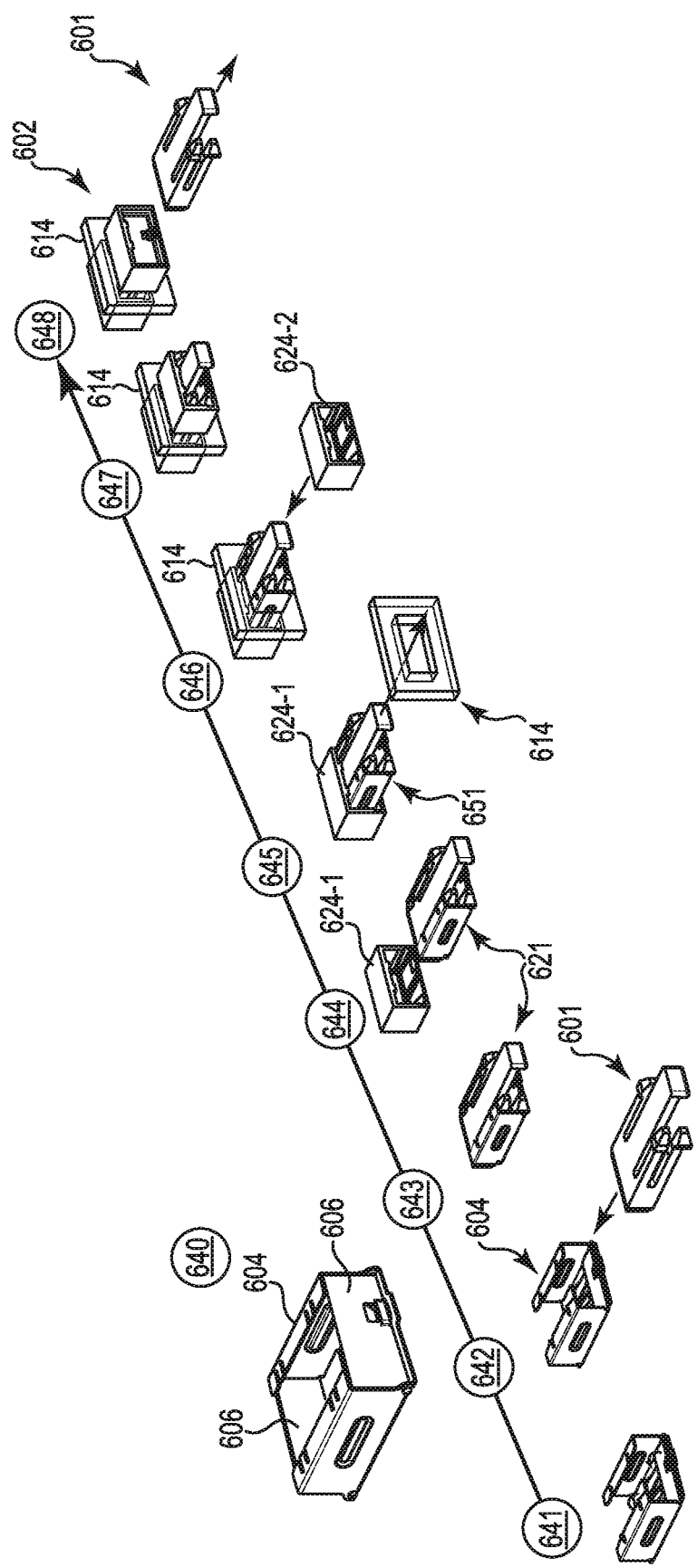
FIG. 6 illustrates a flow diagram of assembly of an optical blind-mate connector adapter, using an optical connector assembly apparatus according to the present disclosure.

FIG. 6 illustrates a flow diagram of assembly of an optical blind-mate connector adapter 602, using an optical connector assembly apparatus 601 according to the present disclosure. At 640, assembly of the optical blind-mate connector adapter 602 can include assembly of the sleeve 604. The sleeve 604 can have shutter flaps 606 that cover an opening in the sleeve 604. The shutter flaps 606 can be installed on opposite sides of an opening in the sleeve 604. At 641, the shutter flaps 606 can be folded into the open position.

At 642, the optical connector assembly apparatus 601 can be inserted into the sleeve 604. As discussed in relation to FIG. 5, insertion of the optical connector assembly apparatus 601 into the sleeve 604 can assist with assembly of the optical blind-mate connector adapter 602 in a number of ways. While inserted into the sleeve 604, the optical connector assembly apparatus 601 can hold the shutter flaps 606 in an open position. Also, when inserted into the sleeve 604, the optical connector assembly apparatus can act as an alignment device for installing the sub-assembly 621 into a mid-plane. As used herein, sub-assembly 621 refers to the sleeve 604 with the optical connector assembly apparatus 601 inserted, as illustrated at 643. As described in relation to FIG. 5, the optical connector assembly apparatus 601 can have a plurality of tips (e.g., tips 509), and each of the tips can have a plane parallel to the lead-in nose of the optical connector assembly apparatus 601 that applies a stopping force against the sleeve 604 in response to insertion of the optical connector assembly apparatus 601 into the sleeve 604. As such, the tips of the optical connector assembly apparatus 601 can be configured to hold the optical connector assembly apparatus 601 in the sleeve 604 after installation.

At 644, assembly of the optical blind-mate connector adapter 602 can include inserting a first end cap 624-1 over the sub-assembly 621. In other words, the sub-assembly 621 is configured to receive a first end cap 624-1. As used herein, the construct of the sub-assembly 621 with the first end cap 624-1 installed can be referred to as the partially assembled connector adapter 651. In some examples, the lead-in nose of the optical connector assembly apparatus 601 (e.g., the lead-in nose 503 illustrated in FIG. 5) can be a beveled, angled, sloped, or otherwise tapered surface that is configured to receive the first end cap 624-1. Configuring the optical connector assembly apparatus to have a beveled, angled, sloped and/or tapered lead-in nose may be beneficial for a number of reasons, as the lead-in nose can protrude beyond the back edge of the sleeve 604 (e.g., back edge 561 illustrated in FIG. 5).

At 645, assembly of the optical blind-mate connector adapter 602 can include inserting the partially assembled connector adapter 651 into a mid-plane 614. In some examples, the mid-plane 614 can be a circuit board, such as an electrical mid-plane circuit board. Examples are not so limited, however, and the mid-plane 614 can be comprised of other materials such as metal and/or plastic, among other materials. As discussed in relation to FIG. 5, the plurality of beams (e.g., the plurality of beams 505 illustrated in FIG. 5) can be configured to receive the mid-plane 614. For instance, the plurality of beams can have beveled tips (e.g., tips 509 illustrated in FIG. 5) that can allow the mid-plane 614 to be installed over the partially assembled connector adapter 651 without compromising the structural integrity of the sleeve 604, the optical connector assembly apparatus 601, and/or the mid-plane 614.

At 646, assembly of the optical blind-mate connector adapter 602 can include installing a second end cap 624-2 over the partially assembled connector adapter 651. In other words, the sub-assembly 621 can be configured to receive a second end cap 624-2. For instance, beams 505-1 and 505-2, illustrated in FIG. 5, can be configured to collapse toward a center of the optical connector assembly apparatus in response to receiving a second end cap 624-2. Similarly, beams 505-3 and 505-2, illustrated in FIG. 5, can be configure to collapse toward the center of the optical connector assembly apparatus 601 in response to receiving the second end cap 624-2. As illustrated at 647, the optical blind-mate connector adapter 602, as fully assembled, can hold the optical connector assembly apparatus 601.

At 648, assembly of the optical blind-mate connector adapter 602 can include removing the optical connector assembly apparatus 601 from the optical blind-mate connector adapter 602. As illustrated at 648, the optical connector assembly apparatus 601 can be configured to allow the shutter flaps 606 to move from the open position to a closed position responsive to removal of the optical connector assembly apparatus 601 from the sleeve 604. As described in relation to FIG. 1, closure of the shutter flaps 606 can be accomplished using cantilever springs (e.g., cantilever springs 116 illustrated in FIG. 1) in the sleeve 604. Removal of the optical connector assembly apparatus 601 from the sleeve 604 can allow the cantilever springs to force the shutter flaps 606 to the closed position.

In some examples (not shown in FIG. 6), the optical connector assembly apparatus 601 can be configured to test proper assembly of the optical blind-mate connector adapter 602. For example, the optical connector assembly apparatus 601 can apply a force to the shutter flaps 606, thereby pushing the shutter flaps 606 to the open position from the closed position. As such, the optical connector assembly apparatus 601 can be configured for reinsertion into the optical blind-mate connector adapter 602 during testing. Using the optical connector assembly apparatus 601 to test proper assembly of the optical blind-mate connector adapter 602 can ensure proper operation of the shutter flaps 606, among other testing functions.

Figure 7:
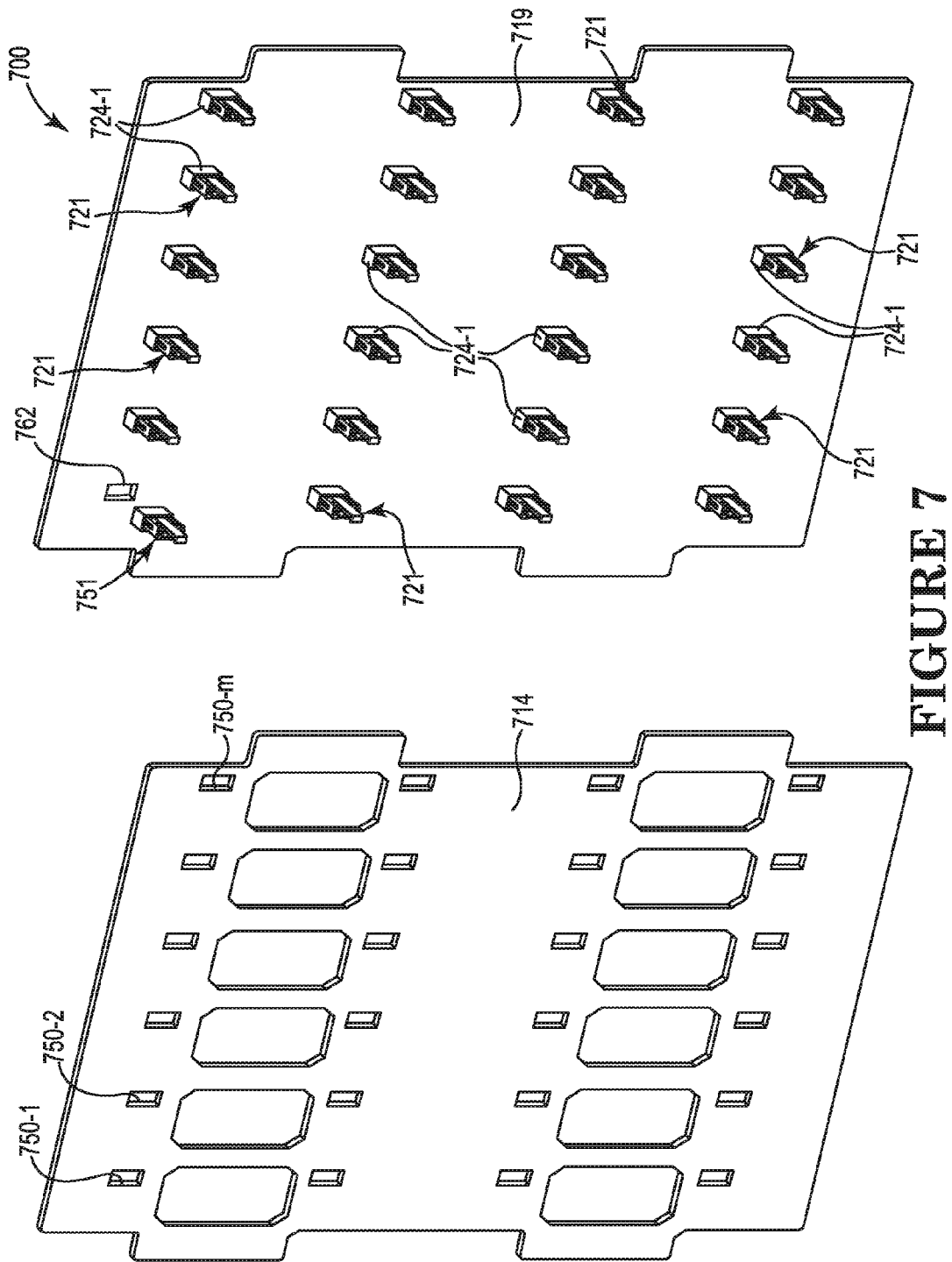
FIG. 7 illustrates a system to assemble optical blind-mate connector adapters according to the present disclosure.

FIG. 7 illustrates a system 700 to assemble optical blind-mate connector adapters according to the present disclosure. As illustrated in FIG. 7, the system 700 can include a mid-plane 714. The mid-plane 714 is a stationary plane that can receive a plurality of partially assembled connector adapters 751. Each partially assembled connector adapter 751 can include a sleeve (e.g., sleeve 504 illustrated in FIG. 5), with the optical connector assembly apparatus (e.g., optical connector assembly 501 illustrated in FIG. 5) inserted, and an end cap (e.g., end cap 624-1 illustrated in FIG. 6) installed. As discussed in relation to FIGS. 1, 2, 3, 4, 5, and 6, each sleeve can have a shutter flap (e.g., shutter flap 106 illustrated in FIG. 1, shutter flap 206 illustrated in FIG. 2, etc.) to cover an opening in the sleeve. The mid-plane 714 can have a plurality of openings 750-1, 750-2, . . . , 750-$m$ (herein referred to as openings 750), that can receive a sleeve. As used herein, an opening refers to a hole in the mid-plane 714. In some examples, the mid-plane 714 can receive a plurality of partially assembled connector adapters 751 at one time. For instance, mid-plane 714 can be provided to an installer without partially assembled connector adapters 751 installed in openings 750. Partially assembled connector adapters 751 can be placed on a second stationary plane 719, where the partially assembled connector adapters 751 are held within respective pockets 762 on 719. As used herein, a pocket 762 on second stationary plane 719 refers to a hole, cavity, dent, depression, or other gap, having features to tightly hold the partially assembled connector adapters 751 in place on the second stationary plane 719. The bottom of the pockets 762 can provide a stopping force when all the partially assembled connector adapters 751 are inserted in the mid-plane 714. The second stationary plane 719 can hold the partially assembled connector adapters 751, and can be used to align all of the plurality of the partially assembled connector adapters 751 in the openings 750 at one time. By installing the plurality of the partially assembled connector adapters 751 into the mid-plane 714 at one time, installation time can be reduced. Following installation of the partially assembled connector adapters 751 from one side of the mid-plane 714 and securing the second end caps (e.g., end caps 624-2 illustrated in FIG. 6) on the respective partially assembled connector adapters 751 from the opposite side of the mid-plane 714 (as illustrated at 646, in FIG. 6), the second stationary plane 719 can be removed.

The system to assemble optical blind-mate connector adapters can also include an optical connector assembly apparatus (e.g., optical connector assembly apparatus 501 illustrated in FIG. 5) disposed in each of the plurality of sleeves included in the sub-assemblies 721. In some examples, each of the optical connector assembly apparatuses can be installed in each of the plurality of sleeves 704 at one time. For example, a third stationary plane (not illustrated in FIG. 7) can hold a plurality of optical connector assembly apparatuses, and can align each of the optical connector assembly apparatuses into a corresponding one of the plurality of sleeves 704. Alternatively and/or additionally, each of the optical connector assembly apparatuses can be individually installed into the plurality of sleeves 704. Regardless of the method of installation, each optical connector assembly apparatus can provide a force to hold the shutter flap of each of the plurality of sleeves 704 in an open position. Once the optical connector assembly apparatus is removed from the sleeve by an opposing force (as discussed in relation to FIG. 6), the shutter flaps of each assembled optical blind-mate connector adapter can return to the closed position.

Also, as discussed in relation to FIGS. 3 and 6, each of the plurality of sleeves 704 can be configured to receive an end cap (e.g., housing ends 324-1 and 324-2 illustrated in FIG. 3). Similarly, each of the optical connector assembly apparatuses can be configured to allow the shutter flap of each of the plurality of sleeves 704 to move from the open position to a closed position in response to removal of the optical connector assembly apparatus from the sleeve 704.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples may be capable of being made without departing from the spirit and scope of the system and method of the present disclosure, this specification merely sets forth some of the many possible example configurations and implementations.

What is claimed is:

1. An optical connector assembly apparatus comprising:
   a lead-in nose disposed at a proximal end of the apparatus for insertion into a sleeve housing, the sleeve housing having a shutter flap to cover an opening in the sleeve;
   a plurality of beams transverse to the lead-in nose, the plurality of beams to provide a force to hold the shutter flap in an open position upon insertion of the apparatus into the sleeve housing;
   a tab disposed at a distal end of the apparatus to receive a first end cap of an optical blind-mate connector adapter; and
   the plurality of beams to receive a second end cap of the optical blind-mate connector adapter.

2. The apparatus of claim 1, wherein each of the plurality of beams has an angled tip distal to the lead-in nose to receive the second end cap of the optical blind-mate connector adapter.

3. The apparatus of claim 1, wherein the angled tip of each of the plurality of beams has a plane parallel to a plane of the lead-in nose to apply a stopping force against the sleeve housing in response to insertion of the apparatus in the sleeve housing.

4. The apparatus of claim 1, wherein each of the plurality of beams has an angled tip distal to the lead-in nose to receive a mid-plane.

5. The apparatus of claim 1, wherein:
   a first beam of the plurality of beams is parallel to a second beam of the plurality of beams; and
   the first beam and the second beam are arranged to collapse toward a center of the apparatus in response to receiving the end cap of the optical blind-mate connector adapter.

6. An optical connector assembly apparatus comprising:
   a beveled surface disposed at a proximal end of the apparatus for insertion into a sleeve housing, the sleeve housing having a shutter flap to cover an opening in the sleeve;
   a plurality of beams transverse to the beveled surface to receive an indent on each side surface of the sleeve housing upon insertion of the optical connector assembly apparatus into the sleeve housing;
   the beveled surface disposed at the proximal end of the apparatus to receive a first end cap of an optical blind-mate connector adapter; and
   the plurality of beams to receive a second end cap of the optical blind-mate connector adapter, wherein the plurality of beams collapses upon receipt of the second end cap of the optical blind-mate connector adapter.

7. The apparatus of claim 6, further including a tab disposed at a distal end of the assembly apparatus, wherein the tab extends away from the sleeve housing.

8. The apparatus of claim 7, wherein each of the plurality of beams and the tab include a hollow core.

9. A system to assemble optical blind-mate connector adapters, the system comprising:
   a sleeve having a shutter flap to cover an opening in the sleeve;
   an optical connector assembly apparatus to provide a force to hold the shutter flap of the sleeve in an open position, wherein insertion of the assembly apparatus into the first sleeve moves the shutter flap into the open position;
   a first end cap to receive the sleeve and the removable optical connector assembly;
   a stationary plane having an opening to receive the sleeve and the optical connector assembly apparatus;
   a second end cap installable over the end of the optical connector assembly apparatus opposite the first end cap, wherein installation of the second end cap collapses a beam of the optical connector assembly apparatus; and
   a cantilever spring coupled to the shutter flap of the sleeve to close the shutter flap in response to removal of the assembly apparatus by an opposing force after installation of the second end cap.

10. The system of claim 9, wherein:
    the shutter flap is a first shutter flap to cover a first opening disposed at a first distal end of the sleeve;
    each sleeve includes a second shutter flap to cover a second opening disposed at a second distal end of the sleeve; and
    the apparatus disposed in each of the sleeve to provide a force to hold the first shutter flap and the second shutter flap in an open position.

11. The system of claim 9, wherein the apparatus disposed in each of the sleeves guides alignment of the plurality of sleeves into the plurality of openings in the second stationary plane.

12. The system of claim 11, wherein the second stationary plane is an electrical mid-plane circuit board.

13. The system of claim 9, wherein the apparatus facilitates the shutter flap to move from the open position to a closed position responsive to removal of the apparatus from the sleeves.

14. The system of claim 9, including a tab disposed at a distal end of the apparatus, the tab extending away from the sleeve.

15. The system of claim 14, wherein the tab has a ribbed surface.

* * * * *